US006776222B2

(12) United States Patent
Seki et al.

(10) Patent No.: US 6,776,222 B2
(45) Date of Patent: Aug. 17, 2004

(54) FOLDABLE FLOOR HEATING PANEL

(75) Inventors: Hitoshi Seki, Inashiki-gun (JP); Michiaki Inoue, Inashiki-gun (JP); Shigeko Iijima, Inashiki-gun (JP)

(73) Assignee: Mitsubishi Chemical Functional Products, Inc., Tokyo (JP)

( * ) Notice: Subject to any disclaimer, the term of this patent is extended or adjusted under 35 U.S.C. 154(b) by 93 days.

(21) Appl. No.: 09/980,096

(22) PCT Filed: Apr. 2, 2001

(86) PCT No.: PCT/JP01/02862
§ 371 (c)(1),
(2), (4) Date: Feb. 12, 2002

(87) PCT Pub. No.: WO01/75369
PCT Pub. Date: Oct. 11, 2001

(65) Prior Publication Data
US 2003/0098142 A1 May 29, 2003

(30) Foreign Application Priority Data
Apr. 3, 2000 (JP) ........................................ 2000-100463

(51) Int. Cl.[7] .............................. F24D 19/02; F28F 7/02
(52) U.S. Cl. ........................... 165/56; 165/49; 165/171; 165/53; 237/69
(58) Field of Search .............................. 165/53, 56, 49, 165/171, 46; 237/69

(56) References Cited

U.S. PATENT DOCUMENTS 3,697,728 A * 10/1972 Stirzenbecher
4,760,922 A * 8/1988 Northgrave
4,782,889 A * 11/1988 Bourne ........................ 165/56
4,846,100 A * 7/1989 Montoya
5,931,381 A * 8/1999 Fiedrich ....................... 237/69
6,009,612 A * 1/2000 Fiedrich et al.
6,220,523 B1 * 4/2001 Fiedrich ....................... 237/69
6,270,016 B1 * 8/2001 Fiedrich ....................... 237/69

FOREIGN PATENT DOCUMENTS

| JP | 3-115323 | 11/1991 |
| JP | 115323/1991 | 11/1991 |
| JP | 5-27514 | 4/1993 |
| JP | 08-261485 | 10/1996 |
| JP | 10-321344 | 12/1998 |
| JP | 11-63530 | 3/1999 |
| JP | 11-211116 | 8/1999 |

* cited by examiner

Primary Examiner—Ljiljana Ciric
(74) Attorney, Agent, or Firm—Wenderoth, Lind & Ponack, L.L.P.

(57) ABSTRACT

A foldable floor heating panel can be folded longitudinally and laterally. The foldable floor heating panel includes several small plate-like members of a rectangular plan configuration, which are arranged longitudinally and laterally so as to be adjacent to each other. A flexible thin plate is attached to upper surfaces of the small plate-like members so as to allow longitudinal and lateral folding. Heat carrier flexible tube passages are provided in longitudinal and lateral folding portions of the panel so as to leave some play, and folding margin members are provided at the lateral folding portions. Fit-in members are attachably and detachably provided in respective heat carrier flexible tube passages with some play.

20 Claims, 4 Drawing Sheets

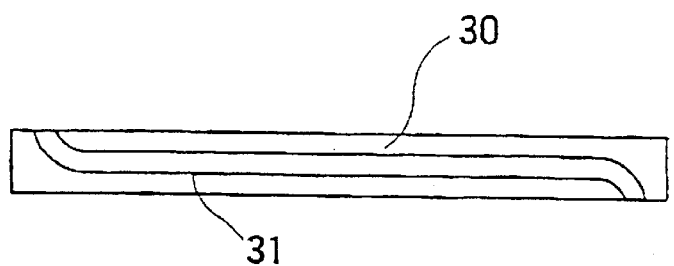
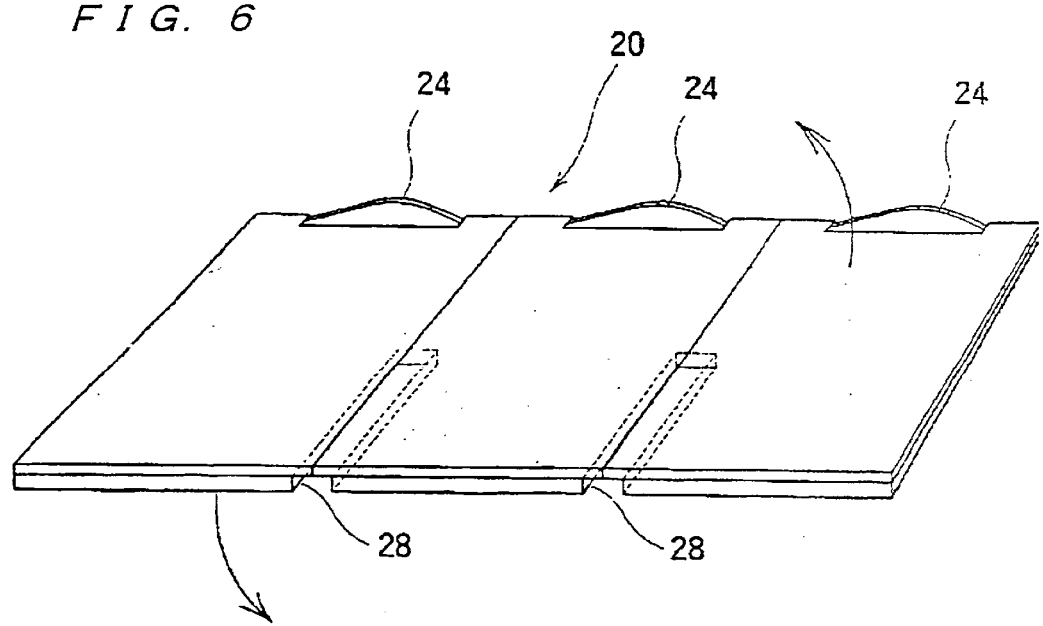

FOLDABLE FLOOR HEATING PANEL

TECHNICAL FIELD

The present invention relates to a foldable floor heating panel structure and, more specifically, to a foldable floor heating panel in which several small plate-like members are arranged longitudinally and laterally, and the foldable floor heating panel can be folded longitudinally and laterally along each small plate-like member so that a panel folding operation and a panel developing operation can be easily performed, thereby facilitating handling of the panel at a time of packaging, transportation, storage, or laying.

BACKGROUND ART

In order to achieve an improvement in terms of comfortability of houses in cold districts, and comfortability of houses in warm districts during a cold season, a floor heating technique for heating a house from a floor in the house has conventionally been proposed and put into practical use. For example, in a case of a single house, a floor heating panel is incorporated between floor joists and a floor board, or installed on a surface of a backing plywood floor laid on floor joists, and the like. In a multiple dwelling house, such as an apartment house, a method in which a floor heating panel is laid directly on an upper surface of a floor slab, or on a surface of a backing plywood floor laid on a floor slab, is adopted.

As an example of a floor heating panel of this type, there has been proposed a structure which includes as a base an elongated plate-like member of foam synthetic resin, wherein grooves are formed in one surface of this base, and a heat carrier flexible tube is embedded in these grooves with the surface being covered with a flexible thin plate such as an aluminum foil. A floor heating panel of such a structure is prepared so as to generally exhibit, for example, a rectangular configuration having a length of 300 cm and a width of 250 cm in accordance with a size of a place of installation. When, however, a length or a width is not less than 200 cm, the floor heating panel is folded so as to be reduced in width by at least half before it is packaged, stored, and transported. Usually, after a folded floor heating panel has been brought to a place of installation, the folded panel is developed for laying.

As an example of such a conventional floor heating panel, which can be folded in a width direction, there has been proposed a floor heating panel having a detachable folding portion. The panel consists of at least two plate-like members with grooves formed therein, arranged adjacent to each other. Heat carrier flexible tubes are arranged in the grooves, and a flexible thin plate is attached to surfaces of the plate-like members, excluding portions where the plate-like members are adjacent to each other. Folding is possible after removing the tubes from the grooves formed near the portions where the plate-like members are adjacent to each other (See Japanese. Utility Model Application Laid-Open No. 5-27514).

However, in this construction, no flexible thin plate is attached to portions of the plate-like members from which the tubes are detached, resulting in a rather poor radiation effect of the floor heating panel as a whole. Moreover, there is a danger of the tubes detached from the grooves being pressurized and crushed between folded plate-like members. Further, when storing this floor heating panel in a folded state, it is necessary to shift adjacent plate-like members with respect to each other so as to prevent the tubes from buckling, so that a storage operation is rather difficult to perform. Further, it is necessary to perform positioning on a plurality of plate-like members when laying them, which means a laying operation is also rather difficult to perform.

As an example of a floor heating panel which is free from a problem of a poor radiation effect and a danger of tube breakage at a time of folding, there has been proposed a floor heating panel in which at least two plate-like members, with grooves, are arranged adjacent to each other to form a separable folding portion, and in which a fit-in portion that allows mounting and detachment is provided at one end with respect to a length direction of a side surface portion of a plate-like member forming the folding portion (See Japanese Patent Laid Open No. 10-89712). This floor heating panel can be folded in a width direction, but cannot be folded in a length direction, so that a problem in that a storage operation and a laying operation are rather difficult to perform has not been solved.

As another example of a foldable floor heating panel, there has been proposed a folding (windable) floor heating panel in which several elongated narrow plate-like members, each having there inside a hollow portion, are connected by a flexible thin plate. The hollow portions for tube arrangement near connecting portions are relatively wide, and a heat carrier flexible tube is arranged in a meandering state in the hollow portions of these plate-like members (See Japanese Patent Laid Open Nos. 8-261485 and 10-321344). However, in this construction also, folding (winding) is only possible in one of a length direction and width direction, which means the panel is rather difficult to handle at a time of packaging, storage, transportation, or laying.

In view of the above problems in the prior art, after careful study to provide a floor heating panel free from such problems, the present inventor has succeeded in completing the present invention.

Thus, it is an object of the present invention to provide a foldable floor heating panel constituted from small plate-like members such that the foldable floor heating panel can be folded along each small plate-like member in both longitudinal and lateral directions, so that a folding operation and a developing operation are easy to perform, and wherein the heating panel is very easy to handle at a time of packaging, transportation, storage, or laying.

SUMMARY OF THE INVENTION

To solve the above technical problems, the present invention provides a foldable floor heating panel constructed as described below. In a first aspect of the invention, there is provided a foldable floor heating panel which is generally of a quadrangular configuration in plan view, in which several small plate-like members, rectangular in plan view and having grooves in their surfaces, are arranged longitudinally and laterally so as to be adjacent to each other, and in which a heat carrier flexible tube(s) is embedded in the grooves of these small plate-like members. The foldable floor heating panel is longitudinally and laterally foldable along each small plate-like member using a flexible thin plate, attached to upper surfaces of the several small plate-like members, as a hinge. Each longitudinal folding portion is formed by opposing narrow side portions of small plate-like members provided with tube passages consisting of cutouts and the flexible thin plate. Each lateral folding portion is formed by opposing wide side portions of the small plate-like members, a narrow and elongated folding margin member (A, B) provided between the wide side portions, and the flexible thin plate. In one lateral row of the small plate-like members, both of two adjacent small plate-like members are connected to folding margin member (A), positioned therebetween, by the flexible thin plate, with the folding margin member (A) being provided with a tube passage. In another lateral row of the small plate-like members, only one of two adjacent small plate-like members is connected to folding margin member (B), positioned therebetween, by the flexible thin plate.

In a second aspect of the invention, there is provided a foldable floor heating panel which is generally of a quadrangular configuration in plan view, in which several small plate-like members, rectangular in plan view and having grooves in their surfaces, are arranged longitudinally and laterally so as to be adjacent to each other, and in which a heat carrier flexible tube(s) is embedded in the grooves of these small plate-like members. The foldable floor heating panel is longitudinally and laterally foldable along each small plate-like member with a flexible thin plate attached to upper surfaces of the several small plate-like members. Tube passages in the form of cutouts are provided in opposing narrow side portions of longitudinally adjacent small plate-like members, and in opposing wide side portions of laterally adjacent small plate-like members. A detachable fit-in member is provided in each tube passage. In one surface of each fit-in member, a groove is formed in connection with grooves in the adjacent small plate-like members, and a heat carrier flexible tube arranged in each tube(s) passage can be embedded in the groove of each fit-in member.

BRIEF DESCRIPTION OF THE DRAWINGS

FIG. 5 is a plan view of an example of a fit-in member provided in the foldable floor heating panel shown in FIG. 4; and FIG. 6 is a perspective view of the foldable floor heating panel of FIG. 4 in a state in which it has been longitudinally folded.

BEST MODE FOR CARRYING OUT THE INVENTION

Figure 1:
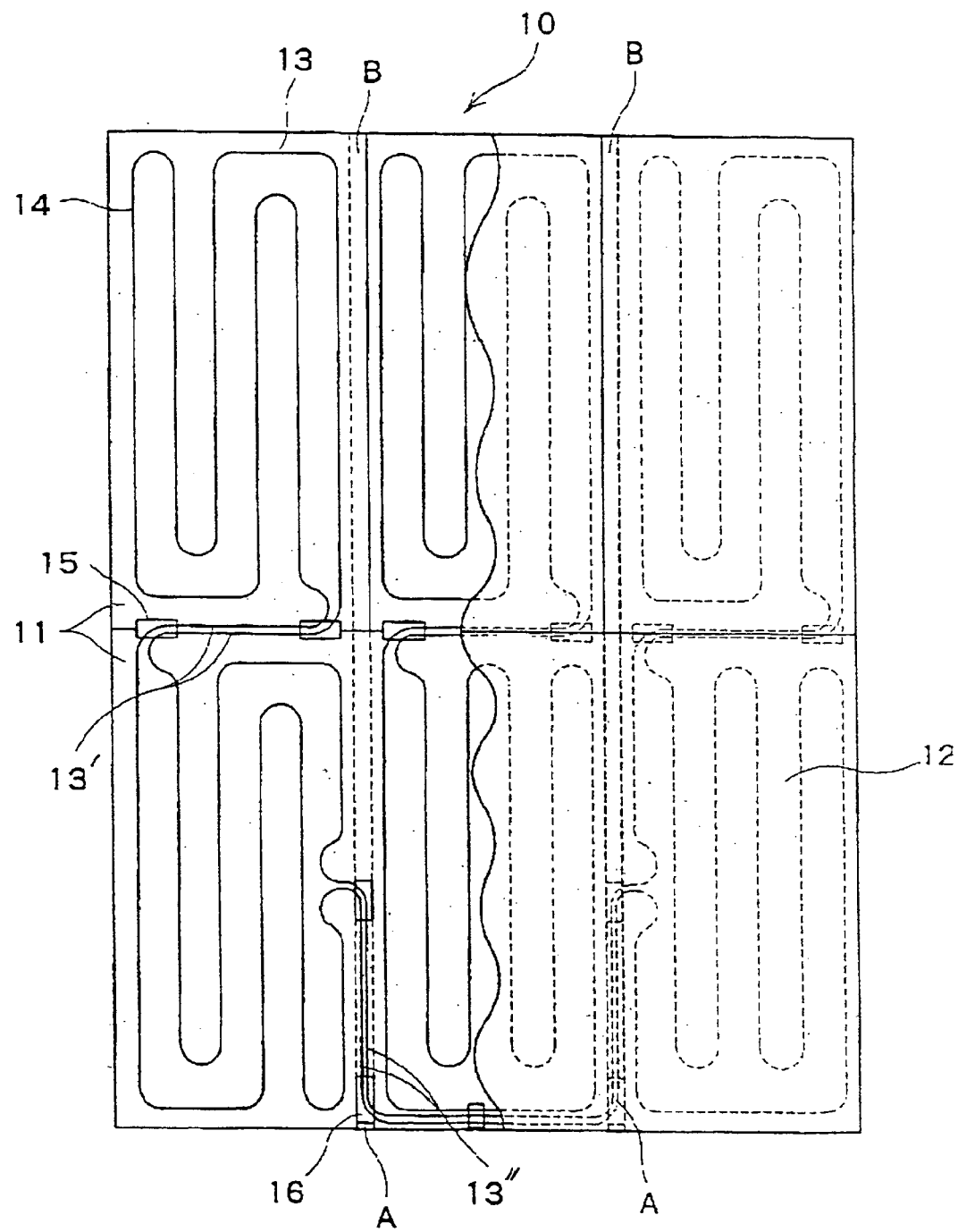
FIG. 1 is a partially cutaway plan view of a foldable floor heating panel according to a first embodiment of the present invention.

A foldable floor heating panel according to a best mode for carrying out the present invention will be described in more detail. In a foldable floor heating panel according to a first aspect of the invention (hereinafter sometimes referred to as "Type I panel"), several small plate-like members which are rectangular in plan view are arranged longitudinally and laterally so as to be adjacent to each other, with a combination of the plate-like members defining a panel that is quadrangular in plan view. There is no particular restriction regarding this quadrangular configuration as long as folding is possible in both longitudinal and lateral directions. The quadrangular configuration may be a square or a rectangle, whose four corners are substantially right angles, or a trapezoid, or a rectangle or trapezoid with rounded corners. As to a size of this Type I panel, it can be appropriately determined according to size of an installation place. For example, it may be a size for a six-mat room (2250 mm×3000 mm) or a size for an eight-mat room (3000 mm×3000 mm).

In principle, two small plate-like members are arranged in a longitudinal direction, and at least two small plate-like members are arranged in a lateral direction. The Type I panel is folded longitudinally and laterally into a size substantially corresponding to a single small plate-like member for packaging, transportation, storage, or laying. Thus, it is desirable for an area of a single small plate-like member to be of such size as to facilitate this packaging, transportation, storage, and laying. For example, the single small plate-like member may be approximately 750 mm×1500 mm. It is possible to embed small joists for reinforcement between grooves in the small plate-like members.

Material of these small plate-like members can be selected from among synthetic resin, hard rubber, wood, metal, plaster, and the like. The synthetic resin may be a thermoplastic synthetic resin or a thermosetting synthetic resin, or it may be a foam or a non-foam resin. Examples of the foam resin include highly rigid foams, such as a cross-linked rubber foam and a thermosetting resin foam, a non-cross-linked polyethylene, a non-cross-linked rubber foam, a polystyrene foam, a foam of a mixture of high-density polyethylene and polystyrene. The wood may be plywood. Examples of the metal include iron and aluminum.

The grooves in the small plate-like members are formed for a purpose of embedding a heat carrier flexible tube(s) therein. Each small plate-like member has such a groove. The grooves are arranged such that, when the small plate-like members are arranged so as to be longitudinally and laterally adjacent to each other, the grooves of these small plate-like members are continuous with each other. A sectional configuration of these grooves taken along a line perpendicular to a direction in which they extend may be semi-circular, U-shaped, quadrangular, and the like. It is desirable for a width and depth of these grooves to be substantially the same as an outer diameter of the heat carrier flexible tube to be embedded (e.g., 7.2 mm). It is possible to attach a metal foil, such as an aluminum foil, to inner walls of these grooves to thereby enhance a heat insulating effect. Examples of a heat carrier flexible tube embedded in these grooves include a cross-linked polyethylene tube and a polybutene tube. A diameter of this tube varies depending on a size of a room in which the panel is laid, thickness of the small plate-like members, and the like. Usually, a tube having an outer diameter of 7.2 mm and an inner diameter of 5 mm is used.

Several small plate-like members are arranged so as to be longitudinally and laterally adjacent to each other, and the heat carrier flexible tube is embedded in the grooves of these small plate-like members, with a flexible thin plate being attached to an upper surface of these members. This flexible thin plate connects adjacent small plate-like members to each other, and functions as a hinge when folding the Type I panel longitudinally and laterally. Examples of the flexible thin plate include an aluminum foil, a tin foil, a stainless steel foil, and a plastic film. Of these, the aluminum foil is preferable from a viewpoint of evenness of heat from the heat carrier flexible tube, ease of production, and cost. When this flexible thin plate is too thin, it is deficient in strength and cannot satisfactorily function as a hinge. On the other hand, when the flexible thin plate is too thick, a resulting product is rather heavy and it involves high cost. A preferable range of thickness is 10 to 500 μm.

A longitudinal folding portion of the Type I panel is formed by opposing narrow side portions of the small plate-like members provided with a tube passage, in the form of cutouts, and the flexible thin plate. That is, the longitudinal folding portion is formed by bringing the narrow side portions of the small plate-like members, provided with the tube passage in the form of cutouts, into contact with each other and attaching the flexible thin plate to the upper surfaces of these members, with the flexible thin plate serving as a hinge to allow longitudinal folding. The tube passage in the form of cutouts can be a space portion with play for the heat carrier flexible tube; that is, a space portion with margin, so that the heat carrier flexible tube is free from tension when the panel is longitudinally folded. Thus, breakage, buckling or the like, of the tube, does not easily occur.

The tube passage may consist of cutouts in the vicinity of end portions of the narrow side portions and grooves that lead to these cutouts, or of relatively deep cutouts in the vicinity of the end portions of the narrow side portions and a relatively shallow cutout extending therebetween. There is no particular limitation regarding a plan configuration (as seen from above) of these cutouts as long as they serve as a passage for the tube; these cutouts may be U-shaped, V-shaped, semicircular, and the like. It is also possible to form the tube passage as a laterally elongated rectangular hole formed from cutouts extending from the vicinity of one end, of each of opposing narrow-side portions of longitudinally adjacent small plate-like members, to the vicinity of another end thereof. Provided in this tube passage is a fit-in member described below so as to be attachable and detachable.

A lateral folding portion of the Type I panel is formed by opposing wide side portions of small plate-like members, with a narrow and elongated folding margin member (A, B) existing between these wide side portions, and a flexible thin plate. That is, this lateral folding portion is formed by providing folding margin member (A, B) between the opposing wide side portions of the small plate-like members, and attaching the flexible thin plate to upper surfaces of these members, such that lateral folding is possible in two steps using the flexible thin plate as a hinge.

Folding margin members (A) provided between one lateral row of small plate-like members of the Type I panel are connected to adjacent small plate-like members by the flexible thin plate, and function as folding portions that allow folding in two steps. In each folding margin member (A), there is provided a tube passage serving as play for a heat carrier flexible tube. Due to presence of this tube passage, the heat carrier flexible tube is free from tension when the Type I panel is laterally folded, so that breakage or the like of the tube does not easily occur. The tube passage can consist of two holes and grooves that lead to these holes. There is no particular restriction regarding a configuration of these holes; the configuration maybe rectangular, circular, elliptical, and the like.

Each of the folding margin members (B), which are provided between the small plate-like members of another lateral row of small plate-like members of the Type I panel, is connected to only one of adjacent small plate-like members by the flexible thin plate. Due to this connection, the folding margin member (B) is separated from another one of the adjacent small plate-like members, thereby allowing folding onto a connected small plate-like member side, using the flexible thin plate as a hinge (See FIG. 2). By thus folding the folding margin members (B) as described above, there are created narrow and elongated spaces between the other small plate-like members in the lateral direction of the Type I panel. Due to these narrow and elongated spaces, the Type I panel, when longitudinally folded, can be further easily folded in the lateral direction (See FIG. 3).

In principle, a length of the folding margin member (A, B) is substantially the same as a length of the wide side portion of each small plate-like member. However, it may be made somewhat smaller taking into account ease of longitudinal folding. When a width of the folding margin member (A, B) is too small, folding is rather hard to perform at a time of folding in two steps {folding margin member (A)}, and a sufficient space cannot be created between laterally adjacent small plate-like members (folding margin member (B)). On the other hand, when this width is too large, a volume of the panel in a folded state is rather large, which is cumbersome when performing packaging, transportation, storage, and the like. A preferable thickness is obtained by multiplying a thickness of a single small plate-like member by a number obtained by subtracting 2 from a total number of small plate-like members.

Due to these constructions of the folding margin members (A) and (B), the heat carrier flexible tube embedded in the grooves of the small plate-like members is continuous between longitudinally adjacent small plate-like members and between adjacent small plate-like members of one lateral row of the small plate-like members with the folding margin members (A) being therebetween, and is discontinuous between adjacent small plate-like members of another lateral row of the small plate-like members with the folding margin members (B) being therebetween.

The Type I panel is folded as follows. First, the folding margin members (B) are folded by using the flexible thin plate as a hinge, thereby forming narrow and elongated spaces between laterally adjacent small plate-like members having the folding margin members (B) therebetween (See FIG. 2). Then, the group of laterally adjacent small plate-like members having the narrow and elongated spaces therebetween are folded longitudinally toward the group of small plate-like members having the folding margin members (A) therebetween, by using the flexible thin plate as a hinge. Next, lateral folding is effected in two steps. With the group of small plate-like members having the narrow and elongated spaces being on an inner side, portions of the flexible thin plate attached to the folding margin members (A) are used as a hinge (See FIG. 3). The Type I panel thus folded can be developed by procedures reverse to the above.

The foldable floor heating panel according to a second aspect of the invention (hereinafter sometimes referred to as "Type II panel") may be the same as the Type I panel in terms of general configuration and size, configuration and size of small plate-like members constituting this Type II panel, mode of grooves formed in the small plate-like members, material and thickness of a heat carrier flexible tube embedded in these grooves, and material and thickness of a flexible thin plate attached to upper surfaces of the small plate-like members. In this Type II panel, the flexible thin plate does not function as a hinge; it is only attached to a surface of each small plate-like member so as to prevent the heat carrier flexible tube from protruding and to prevent heat from being dissipated. Thus, the small plate-like members constituting the Type II panel are connected solely by the heat carrier flexible tube.

In the Type II panel, tube passages in the form of cutouts are provided in opposing narrow side portions of longitudinally adjacent small plate-like members, and in opposing wide side portions of laterally adjacent small plate-like members. These tube passages can provide play for the heat carrier flexible tube, and the heat carrier flexible tube is free from tension when the Type II panel is folded longitudinally and laterally. Thus, breakage, or the like, of the tube does not easily occur. In each tube passage, there is provided a fit-in member described below so as to be detachable. The tube passage in the opposing narrow side portions may be in the form of cutouts extending from the vicinity of one end of the narrow side portions to the vicinity of another end thereof, with the cutouts being opposed to form a hole which is rectangular, elliptical, rhombic, and the like.

Due to longitudinal tube passages, i.e. tube passages in the opposing narrow side portions, the heat carrier flexible tube embedded in the grooves is continuous between longitudinally adjacent small plate-like members. Further, taking into consideration ease of lateral folding after longitudinal folding, it is desirable that lateral tube passages be provided between adjacent small plate-like members of only one lateral row of the small plate-like members, with the heat carrier flexible tube being continuous between these small plate-like members, and that no tube passages be provided between adjacent small plate-like members of another lateral row of the small plate-like members such that the heat carrier flexible tube is discontinuous between these small plate-like members.

In the longitudinal and lateral tube passages of the Type II panel, there are provided fit-in members that allow attachment and detachment. In one surface of each of these fit-in members, there is formed a groove communicating with the grooves of both adjacent small plate-like members. Within the groove of this fit-in member, the heat carrier flexible tube arranged in the tube passage can be embedded. When folding the Type II panel, this fit-in member is detached from each tube passage, and when laying the Type II panel, the fit-in member is attached to each tube passage and the heat carrier flexible tube is embedded within the groove thereof, thus making a surface of the Type II panel even and free from occurrence of protrusions and recesses.

When the flexible thin plate is attached to another surface of each fit-in member, heat radiated from the heat carrier flexible tube is advantageously transmitted uniformly to an entire panel surface. When there is a difference in plan configuration between the longitudinal and lateral tube passages, separate fit-in members of different plan configurations are prepared for longitudinal and lateral directions. When plan configurations of both of the longitudinal and lateral tube passages are the same, it is possible to use fit-in members of the same plan configurations for both longitudinal and lateral directions.

The Type II panel is folded as follows. First, the fit-in members are removed from the Type II panel, when in an installed state. Then, a group of small plate-like members longitudinally adjacent to each other are folded toward a side to which the flexible thin plate is attached. Next, a group of small plate-like members longitudinally folded are folded in a lateral direction. In this process, the small plate-like members laterally adjacent to each other are alternately folded to opposite sides. For example, when three small plate-like members are laterally connected to each other, a small plate-like member situated at one lateral end is folded onto an upper side of a central small plate-like member, and a small plate-like member situated at another lateral end is folded onto a lower side of the central small plate-like member. The Type II panel thus folded can be developed by procedures reverse to the above.

DETAILED DESCRIPTION OF THE PREFERRED EMBODIMENTS

Specific embodiments of a foldable floor heating panel of the present invention will now be described with reference to the drawings. The following embodiments, however, should not be construed restrictively, and various modifications are possible without departing from the scope of the invention.

Figure 2:
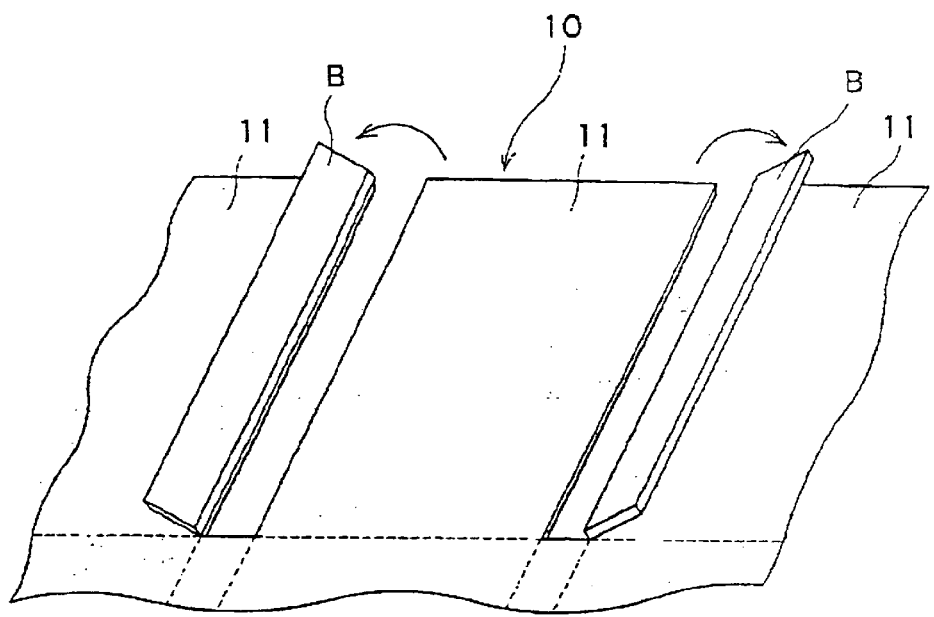
FIG. 2 is a partial enlarged perspective view of the foldable floor heating panel shown in FIG. 1.
Figure 3:
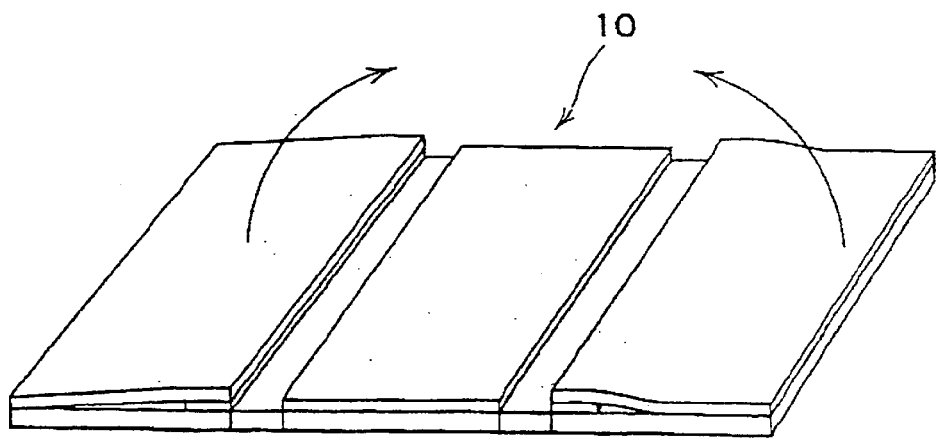
FIG. 3 is a perspective view showing the foldable floor heating panel of FIG. 1 in a state in which it has been longitudinally folded.

FIG. 1 is a partially cutaway plan view of a foldable floor heating panel according to an embodiment of the present invention; FIG. 2 is a partial enlarged perspective view of the foldable floor heating panel shown in FIG. 1; and FIG. 3 is a perspective view showing the foldable floor heating panel of FIG. 1 in a state in which it has been longitudinally folded.

Figure 4:
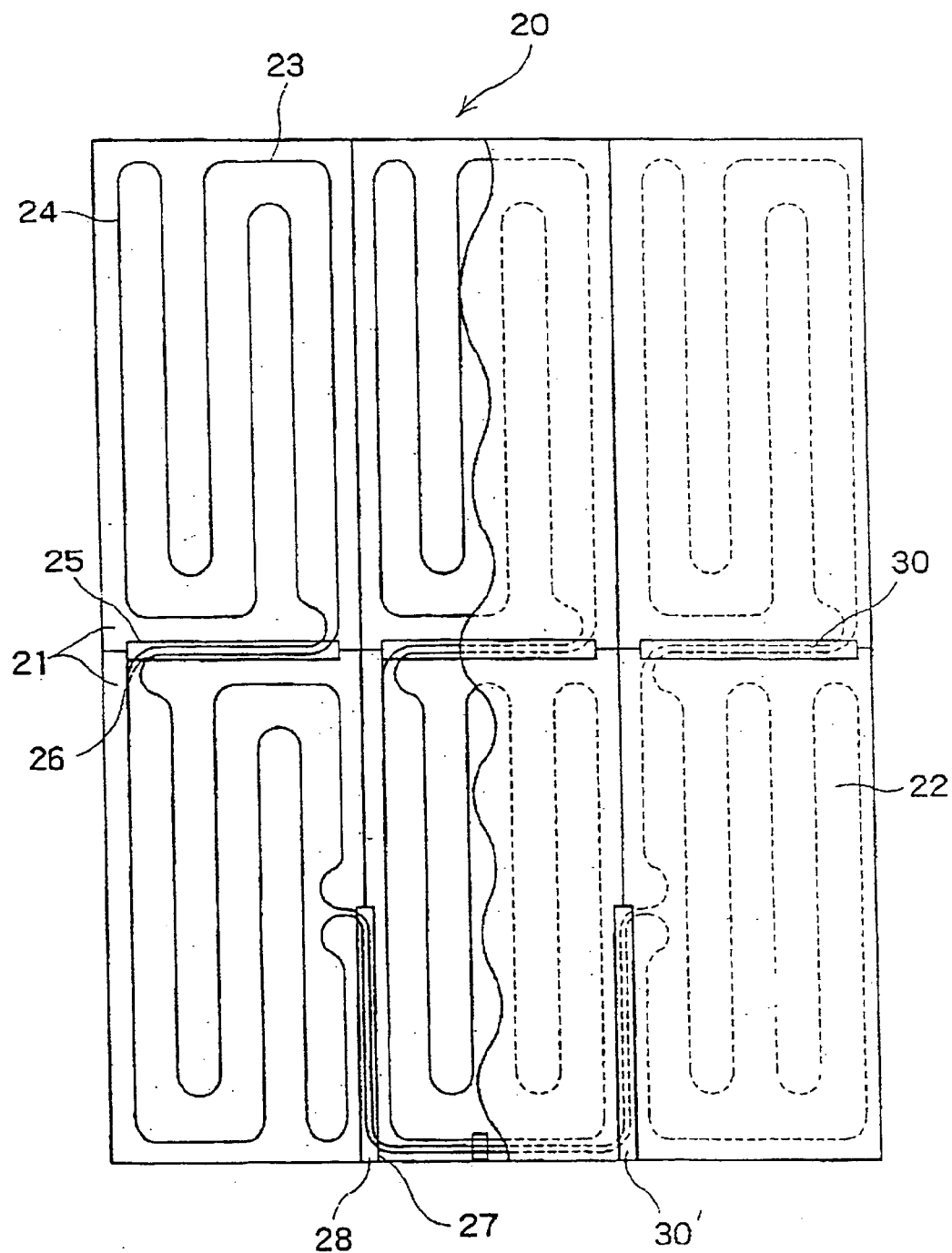
FIG. 4 is a partially cutaway plan view of a foldable floor heating panel according to a second embodiment of the present invention.

FIG. 4 is a partially cutaway plan view of a foldable floor heating panel according to another embodiment of the present invention; FIG. 5 is a plan view of an example of a fit-in member provided in the foldable floor heating panel shown in FIG. 4; and FIG. 6 is a perspective view of the foldable floor heating panel of FIG. 4 in a state in which it has been longitudinally folded.

In a Type I panel 10 shown in FIG. 1, small plate-like members 11 having the same plan configuration are arranged in three longitudinal rows (each consisting of two plate-like members) and in two lateral rows (each consisting of three plate-like members) respectively through intermediation of folding margin members (A) and (B), with the small plate-like members being connected to each other by a flexible thin plate 12. In a surface of each of the small plate-like members 11 constituting the Type I panel 10, there is formed a groove 13, in which a heat carrier flexible tube 14 is embedded. Each of the folding margin members (A) provided between the small plate-like members of one lateral row of the Type I panel 10 is connected to both adjacent small plate-like members to allow folding in two stages. Each of the folding margin members (B) provided between the small plate-like members of the other lateral row of the Type I panel 10 is connected to one of the small plate-like members.

In longitudinal folding portions of the Type I panel 10, there are formed longitudinal tube passages, each of which is formed by cutouts 15 situated in the vicinity of end portions of opposing narrow side portions of longitudinally adjacent small plate-like members 11, and a communication groove 13' communicating therewith, with heat carrier flexible tube 14 being arranged so as to extend from one to another of longitudinally adjacent small plate-like members by way of a respective longitudinal tube passage. Further, each of the folding margin members (A), constituting lateral folding portions of the Type I panel 10, is equipped with a lateral tube passage formed by two holes 16 and groove 13" connecting these two holes, with heat carrier flexible tube 14 being arranged so as to extend from one to another of laterally adjacent small plate-like members by way of this lateral tube passage.

FIG. 2 shows the folding margin members (B) of the Type I panel 10 of FIG. 1 in a state in which they are folded to a side to which the flexible thin plate 12 is attached. By folding these folding margin members (B) by using the flexible thin plate 12 as a hinge, narrow and elongated spaces are defined between laterally adjacent small plate-like members 11. FIG. 3 shows the Type I panel 10 of FIG. 1 in a state in which it has been longitudinally folded. To attain the state of FIG. 3, the folding margin members (B) in the state of FIG. 1 are folded to attain the state of FIG. 2, and then the Type I panel 10 is folded at the longitudinal folding portion. To laterally fold the Type I panel 10 in the state of FIG. 3 at the lateral folding portions, a small plate-like member situated at one lateral end is folded toward a central small plate-like member as indicated by an arrow, and then a small plate-like member situated at another lateral end is folded toward the central small plate-like member as indicated by the other arrow.

In the Type II panel 20 shown in FIG. 4, small plate-like members 21 having the same plan configuration are arranged in three longitudinal rows (each consisting of two plate-like members) and in two lateral rows (each consisting of three plate-like members), with a flexible thin plate 22 being attached to the small plate-like members 21. In the surface of each small plate-like member 21, there is formed a groove 23, in which a heat carrier flexible tube 24 is embedded. This heat carrier flexible tube 24 connects longitudinally adjacent small plate-like members to adjacent small plate-like members of one lateral row.

In this Type II panel 20, there are formed, in opposing narrow side portions of the longitudinally adjacent small plate-like members 21, laterally elongated rectangular holes 26 consisting of cutouts 25, each of which extends from the vicinity of one end to the vicinity of another end of the narrow side portion of each small plate-like member 21. Heat carrier flexible tube 24 extends from one to another of each pair of laterally adjacent small plate-like members 21 by way of the laterally elongated rectangular hole 26. A fit-in member 30 is detachably provided in each laterally elongated hole 26.

Further, in the Type II panel 20, there are provided, in opposing wide side portions of laterally adjacent small plate-like members 21, longitudinally elongated rectangular holes 28 consisting of cutouts 27, each of which extends from one end of the wide side portion of each small plate-like member 21 to a central portion of the wide side portion with respect to a length direction. The heat carrier flexible tube 24 is arranged so as to extend from one to another of the laterally adjacent small plate-like members by way of the longitudinally elongated rectangular holes 28. A fit-in member 30' is detachably provided in each longitudinally elongated rectangular hole 28.

FIG. 5 shows one of the fit-in members 30 to be attachably and detachably provided in one of the laterally elongated rectangular holes 26 provided in the Type II panel 20 shown in FIG. 4. A groove 31 is formed in a surface of this fit-in member 30. When the fit-in member 30 is mounted in the laterally elongated rectangular hole 26, the groove 31 communicates with the grooves 23 formed in the longitudinally adjacent small plate-like members 21, and the heat carrier flexible tube 24 arranged in the laterally elongated rectangular hole 26 is embedded in this groove.

FIG. 6 shows the Type II panel 20 of FIG. 4 in a state in which it has been longitudinally folded. To attain the state of FIG. 6, the fit-in members are removed from the rectangular holes of the Type II panel shown in FIG. 4, and then this Type II panel 20 is folded longitudinally. To laterally fold the Type II panel 20 in the state of FIG. 6, a right-hand side small plate-like member is folded upwardly onto an upper side of a central small plate-like member, as indicated by a narrow, and a left-hand side small plate-like member is folded downwardly onto a lower side of a central small plate-like member, as indicated by the other arrow.

The present invention, described in detail above, provides the following special advantages and is of very high industrial applicability. (1) The foldable floor heating panel of the present invention has in longitudinal and lateral folding portions tube passages which allow a heat carrier flexible tube to be arranged with play, so that the panel can be easily folded longitudinally and laterally. (2) Since the foldable floor heating panel of the present invention can be easily folded longitudinally and laterally, operations of packaging, transporting, and storing the panel are facilitated to a remarkable degree. (3) The foldable floor heating panel of the present invention when in state folded longitudinally and laterally can be easily developed, so that operation of laying the panel after transferring it to a place of installation is facilitated to a remarkable degree. (4) The foldable floor heating panel of the present invention has in the longitudinal and lateral folding portions tube passages which allow the heat carrier flexible tube to be arranged with play, so that there is no danger of the heat carrier flexible tube being crushed or damaged at the folding portions when folding the panel.

INDUSTRIAL APPLICABILITY

The foldable floor heating panel of the present invention can be used as a floor heating apparatus to be installed on a house floor for heating. In a multiple dwelling house, such as an apartment house, the foldable floor heating panel can be laid directly on an upper surface of a floor slab, on a surface of a backing plywood floor laid on a floor slab, or the like, and used as a heating apparatus.

What is claimed is:

1. A foldable panel comprising:
   plural plate-like members, said plural plate-like members including
   (i) a first plate-like member having
      (a) a first side having a cutout therein, and
      (b) a surface having a groove therein,
   (ii) a second plate-like member having
      (a) a first side having a cutout therein,
      (b) a second side having a cutout therein, with said second side being generally orthogonal to said first side, and
      (c) a surface having a groove therein, and
   (iii) a third plate-like member having
      (a) a first side having a cutout therein, and
      (b) a surface having a groove therein; and
   a flexible thin sheet attached to a surface of each of said plural plate-like members so as to interconnect said plural plate-like members such that said plural plate-like members are foldable, from an unfolded condition, into a folded condition by folding said second plate-like member relative to said third plate-like member about said first side of said third plate-like member and by folding said second plate-like member relative to said first plate-like member about said first side of said first plate-like member,
   wherein when said plural plate-like members are in the unfolded condition, said cutout in said second side of said second plate-like member opposes said cutout in said first side of said third plate-like member to define a first recess, and said cutout in said first side of said first plate-like member opposes said cutout in said first side of said second plate-like member to define a second recess.

2. The foldable panel according to claim 1, further comprising:
   a first fit-in member constructed and arranged to be detachably received within said first recess, said first fit-in member having a groove in a surface thereof such that when said first fit-in member is in said first recess said groove in said surface of said first fit-in member interconnects said groove in said surface of said second plate-like member and said groove in said surface of said third plate-like member; and a second fit-in member constructed and arranged to be detachably received within said second recess, said second fit-in member having a groove in a surface thereof such that when said second fit-in member is in said second recess said groove in said surface of said second fit-in member interconnects said groove in said surface of said first plate-like member and said groove in said surface of said second plate-like member.

3. The foldable panel according to claim 2, further comprising:
a heat carrier flexible tube within said groove in said surface of said second plate-like member, within said groove in said surface of said first plate-like member, within said groove in said surface of said third plate-like member, and within said grooves in said surfaces of said first and second fit-in members when said first and second fit-in members are in said first and second recesses, respectively.

4. The foldable panel according to claim 3, wherein
said plural plate-like members further include a fourth plate-like member having
(i) a first side having a cutout therein, and
(ii) a surface having a groove therein,
said first plate-like member further includes a second side having a cutout therein, and
said flexible thin sheet is attached to a surface of said fourth plate-member so as to interconnect said fourth plate-like member with said first, second and third plate-like members such that said plural plate-like members are foldable, from the unfolded condition, into the folded condition by also folding said first plate-like member relative to said fourth plate-like member about said first side of said fourth plate-like member, with said cutout in said second side of said first plate-like member opposing said cutout in said first side of said fourth plate-like member to define a third recess when said plural plate-like members are in the unfolded condition, and further comprising:
a third fit-in member constructed and arranged to be detachably received within said third recess, said third fit-in member having a groove in a surface thereof such that when said third fit-in member is in said third recess said groove in said surface of said third fit-in member interconnects said groove in said surface of said first plate-like member and said groove in said surface of said fourth plate-like member, whereby said heat carrier flexible tube is also within said groove in said surface of said fourth plate-like member and said groove in said surface of said third fit-in member when said third fit-in member is in said third recess.

5. The foldable panel according to claim 4, wherein
said plural plate-like members are each rectangular in shape such that said plural plate-like members, by being interconnected by said flexible thin sheet, define a quadrangular configuration.

6. The foldable panel according to claim 5, wherein
said grooves in surfaces of said first, second, third and fourth plate-like members, respectively, comprise grooves in upper surfaces of said first, second, third and fourth plate-like members, respectively, and
said flexible thin sheet is attached to surfaces of said first, second, third and fourth plate-like members by being attached to said upper surfaces of said first, second, third and fourth plate-like members.

7. The foldable panel according to claim 6, wherein
said second side of said first plate-like member, said second side of said second plate-like member, said first side of said third plate-like member and said first side of said fourth plate-like member are each shorter in length than that of each of said first side of said first plate-like member and said first side of said second plate-like member.

8. The foldable panel according to claim 7, wherein
said cutout in said second side of said first plate-like member extends from near one end of said second side to near another end of said second side,
said cutout in said second side of said second plate-like member extends from near one end of said second side to near another end of said second side,
said cutout in said first side of said third plate-like member extends from near one end of said first side to near another end of said first side,
said cutout in said first side of said fourth plate-like member extends from near one end of said first side to near another end of said first side,
said cutout in said first side of said first plate-like member extends from one end of said first side to near a central portion of said first side, and
said cutout in said first side of said second plate-like member extends from one end of said first side to near a central portion of said first side.

9. The foldable panel according to claim 8, wherein each of said first, second and third recesses is rectangular in shape.

10. The foldable panel according to claim 2, wherein
said plural plate-like members further include a fourth plate-like member having
(i) a first side having a cutout therein, and
(ii) a surface having a groove therein,
said first plate-like member further includes a second side having a cutout therein, and
said flexible thin sheet is attached to a surface of said fourth plate-member so as to interconnect said fourth plate-like member with said first, second and third plate-like members such that said plural plate-like members are foldable, from the unfolded condition, into the folded condition by also folding said first plate-like member relative to said fourth plate-like member about said first side of said fourth plate-like member, with said cutout in said second side of said first plate-like member opposing said cutout in said first side of said fourth plate-like member to define a third recess when said plural plate-like members are in the unfolded condition, and further comprising:
a third fit-in member constructed and arranged to be detachably received within said third recess, said third fit-in member having a groove in a surface thereof such that when said third fit-in member is in said third recess said groove in said surface of said third fit-in member interconnects said groove in said surface of said first plate-like member and said groove in said surface of said fourth plate-like member.

11. The foldable panel according to claim 2, wherein
said grooves in surfaces of said first, second and third plate-like members, respectively, comprise grooves in upper surfaces of said first, second and third plate-like members, respectively, and
said flexible thin sheet is attached to surfaces of said first, second and third plate-like members by being attached to said upper surfaces of said first, second and third plate-like members.

12. The foldable panel according to claim 2, wherein
said cutout in said second side of said first plate-like member extends from near one end of said second side to near another end of said second side,
said cutout in said second side of said second plate-like member extends from near one end of said second side to near another end of said second side,
said cutout in said first side of said third plate-like member extends from near one end of said first side to near another end of said first side,
said cutout in said first side of said first plate-like member extends from one end of said first side to near a central portion of said first side, and
said cutout in said first side of said second plate-like member extends from one end of said first side to near a central portion of said first side.

13. The foldable panel according to claim 2, wherein
said second side of said first plate-like member, said second side of said second plate-like member and said first side of said third plate-like member are each shorter in length than that of each of said first side of said first plate-like member and said first side of said second plate-like member.

14. The foldable panel according to claim 1, further comprising:
a heat carrier flexible tube within said groove in said surface of said second plate-like member, within said groove in said surface of said first plate-like member, and within said groove in said surface of said third plate-like member.

15. The foldable panel according to claim 1, wherein
said plural plate-like members further include a fourth plate-like member having
(i) a first side having a cutout therein, and
(ii) a surface having a groove therein,
said first plate-like member further includes a second side having a cutout therein, and
said flexible thin sheet is attached to a surface of said fourth plate-member so as to interconnect said fourth plate-like member with said first, second and third plate-like members such that said plural plate-like members are foldable, from the unfolded condition, into the folded condition by also folding said first plate-like member relative to said fourth plate-like member about said first side of said fourth plate-like member, with said cutout in said second side of said first plate-like member opposing said cutout in said first side of said fourth plate-like member to define a third recess when said plural plate-like members are in the unfolded condition.

16. The foldable panel according to claim 15, wherein
said plural plate-like members are each rectangular in shape such that said plural plate-like members, by being interconnected by said flexible thin sheet, define a quadrangular configuration.

17. The foldable panel according to claim 1, wherein
said grooves in surfaces of said first, second and third plate-like members, respectively, comprise grooves in upper surfaces of said first, second and third plate-like members, respectively, and
said flexible thin sheet is attached to surfaces of said first, second and third plate-like members by being attached to said upper surfaces of said first, second and third plate-like members.

18. The foldable panel according to claim 1, wherein
said second side of said first plate-like member, said second side of said second plate-like member and said first side of said third plate-like member are each shorter in length than that of each of said first side of said first plate-like member and said first side of said second plate-like member.

19. The foldable panel according to claim 1, wherein
said cutout in said second side of said first plate-like member extends from near one end of said second side to near another end of said second side,
said cutout in said second side of said second plate-like member extends from near one end of said second side to near another end of said second side,
said cutout in said first side of said third plate-like member extends from near one end of said first side to near another end of said first side,
said cutout in said first side of said first plate-like member extends from one end of said first side to near a central portion of said first side, and
said cutout in said first side of said second plate-like member extends from one end of said first side to near a central portion of said first side.

20. The foldable panel according to claim 1, wherein each of said first and second recesses is rectangular in shape.

* * * * *